US010375080B2

(12) United States Patent
Nayshtut et al.

(10) Patent No.: US 10,375,080 B2
(45) Date of Patent: *Aug. 6, 2019

(54) SUPERVISED ONLINE IDENTITY

(71) Applicant: Intel Corporation, Santa Clara, CA (US)

(72) Inventors: Alex Nayshtut, Gan Yavne (IL); Omer Ben-Shalom, Rishon Le-Tzion (IL); Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,867

(22) Filed: Apr. 3, 2017

(65) Prior Publication Data
US 2017/0324743 A1 Nov. 9, 2017

Related U.S. Application Data

(63) Continuation of application No. 14/129,425, filed as application No. PCT/US2013/048545 on Jun. 28, 2013, now Pat. No. 9,614,857.

(51) Int. Cl.
*H04L 29/06* (2006.01)
*G06F 21/55* (2013.01)
(Continued)

(52) U.S. Cl.
CPC .......... *H04L 63/102* (2013.01); *G06F 21/554* (2013.01); *G06F 21/629* (2013.01);
(Continued)

(58) Field of Classification Search
None
See application file for complete search history.

(56) References Cited

U.S. PATENT DOCUMENTS

| 5,649,116 A | 7/1997 | McCoy |
| 6,219,790 B1 | 4/2001 | Lloyd |

(Continued)

FOREIGN PATENT DOCUMENTS

| CN | 1495624 | 5/2004 |
| CN | 102291456 | 12/2011 |

(Continued)

OTHER PUBLICATIONS

International Search Report dated Mar. 31, 2014 in PCT Application No. PCT/US2013/048545.

(Continued)

*Primary Examiner* — Shin-Hon (Eric) Chen
(74) *Attorney, Agent, or Firm* — Christopher K. Gagne

(57) ABSTRACT

Technologies to facilitate supervision of an online identify include a gateway server to facilitate and monitor access to an online service by a user of a "child" client computer device. The gateway server may include an identity manager to receive a request for access to the online service from the client computing device, retrieve access information to the online service, and facilitate access to the online service for the client computing device using the access information. The access information is kept confidential from the user. The gateway server may also include an activity monitor module to control activity between the client computing device and the online service based on the set of policy rules of a policy database. The gateway server may transmit notifications of such activity to a "parental" client computing device for review and/or approval, which also may be used to update the policy database.

35 Claims, 7 Drawing Sheets

(51) Int. Cl.
  *G06F 21/62* (2013.01)
  *H04L 29/08* (2006.01)

(52) U.S. Cl.
  CPC .......... *H04L 63/105* (2013.01); *H04L 63/205* (2013.01); *H04L 67/22* (2013.01); *G06F 2221/2137* (2013.01); *G06F 2221/2149* (2013.01); *H04L 63/083* (2013.01); *H04L 63/101* (2013.01); *H04L 63/20* (2013.01); *H04L 67/306* (2013.01)

(56) References Cited

U.S. PATENT DOCUMENTS

| | | | |
|---|---|---|---|
| 8,478,989 B2 | 7/2013 | Lynch | |
| 8,984,620 B2 | 3/2015 | Sonwane | |
| 9,614,857 B2 | 4/2017 | Nayshtut | |
| 2002/0049806 A1* | 4/2002 | Gatz | G06F 21/62 709/203 |
| 2002/0112183 A1 | 8/2002 | Baird | |
| 2003/0195859 A1 | 10/2003 | Lawrence | |
| 2004/0003071 A1 | 1/2004 | Mathew | |
| 2005/0193093 A1 | 9/2005 | Mathew | |
| 2006/0059564 A1* | 3/2006 | Tan | H04L 63/105 726/27 |
| 2008/0183852 A1 | 7/2008 | Pramer | |
| 2009/0077621 A1 | 3/2009 | Lang | |
| 2009/0150991 A1* | 6/2009 | Hoey | G06F 21/33 726/18 |
| 2009/0177514 A1 | 7/2009 | Hudis | |
| 2009/0254656 A1 | 10/2009 | Vignisson | |
| 2010/0235877 A1 | 9/2010 | Hu | |
| 2010/0250411 A1 | 9/2010 | Ogrodski | |
| 2010/0325710 A1* | 12/2010 | Etchegoyen | G06F 21/31 726/7 |
| 2011/0065419 A1* | 3/2011 | Book | G06F 21/305 455/411 |
| 2011/0231927 A1 | 9/2011 | Tovar | |
| 2011/0321079 A1 | 12/2011 | Lankford | |
| 2012/0072592 A1 | 3/2012 | Lidstrom | |
| 2013/0017806 A1* | 1/2013 | Sprigg | H04M 1/66 455/411 |
| 2013/0031601 A1* | 1/2013 | Bott | G06F 21/552 726/1 |
| 2013/0065555 A1* | 3/2013 | Baker | G06Q 20/105 455/410 |
| 2013/0152198 A1 | 6/2013 | Akiyama | |
| 2013/0185206 A1* | 7/2013 | Leggett | G06Q 20/32 705/44 |
| 2013/0275571 A1 | 10/2013 | Barton | |
| 2014/0068266 A1 | 3/2014 | Cismas | |
| 2014/0359691 A1 | 12/2014 | Woods | |

FOREIGN PATENT DOCUMENTS

| | | |
|---|---|---|
| EP | 1132797 | 9/2001 |
| EP | 1376981 | 1/2004 |
| WO | 2013010147 A1 | 1/2013 |
| WO | 2014/209357 | 12/2014 |

OTHER PUBLICATIONS

Written Opinion dated Mar. 31, 2014 in PCT Application No. PCT/US2013/048545.
International Preliminary Examination Report dated Dec. 29, 2015 in PCT Application No. PCT/US2013/048545.
Office Action dated Mar. 3, 2016 in U.S. Appl. No. 14/129,425, and related attachments.
Notice of Allowance dated Oct. 5, 2016 in U.S. Appl. No. 14/129,425, and related attachments.
Extended European Search Report dated Dec. 2, 2016 in European Patent Application No. 13887674.3.
Office Action dated Sep. 9, 2016 in Korean Patent Application No. 2015-7033810, and summarized partial English translation thereof.
Grant of Patent dated May 9, 2016 in Korean Patent Application No. 2015-7033810, and English translation thereof.
Office Action dated Dec. 20, 2017 in European Patent Application No. 17201146.2, and related attachments.
Notice of European Publication dated Mar. 7, 2018 in European Patent Application No. 17201146.2.
Communication pursuant to Rule 69 EPC dated Apr. 9, 2018 in European Patent Application No. 17201146.2.
Office Action dated Apr. 3, 2018 in Chinese Patent Application No. 201380076938.5, and related attachments.
Office Action dated Apr. 3, 2018 in Chinese Patent Application No. 201380076938.5, related attachments, and partial summarized English translation.
Office Action dated Sep. 3, 2018 in Chinese Patent Application No. 201380076938.5, related attachments, and partial summarized English translation.
Office Action dated Nov. 8, 2018 in EPO Application No. 17201146.2.
Letter accompanying subsequently filed items dated Nov. 14, 2018 in EPO Application No. 17201146.2.
Decision to allow further processing dated Nov. 21, 2018 in European Patent Application No. 17201146.2.
Notice of Granting Patent Right for Invention and Notice of Completing Formalities for Patent Registration dated Feb. 11, 2019 in Chinese Patent Application No. 201380076938.5, and partial summarized English translation thereof.
Office Action dated Jun. 3, 2019 in European Patent Application No. 13887674.3.

* cited by examiner

SUPERVISED ONLINE IDENTITY

CROSS-REFERENCE TO RELATED APPLICATIONS

The present application is a continuation application of U.S. application Ser. No. 14/129,425, entitled "SUPERVISED ONLINE IDENTITY," which was filed on Dec. 26, 2013 and which is a national stage entry under 35 USC § 371(b) of International Application No. PCT/US2013/048545, which was filed Jun. 28, 2013.

BACKGROUND

As the popularity and access of online services increases, the risk such online services pose to users, especially minors, is an ever increasing concern. For example, while many parents desire to allow their children reasonable access to online services, such as social networking, web surfing, and gaming services, parents are often concerned with the potential misuse of the online services by the children and/or exposure of the children to online abuse (e.g., scamming, inappropriate content, etc.) by the online services and/or unknown third parties. Controlling access to the online services is complicated in those situations in which the child has access to the online services via a number of different devices, such as a home computer, a smartphone, a tablet computer, etc. Additionally, in some circumstances, parents may desire more granularity in the control of the access of the online services (e.g., controlling the times at which, or duration for which, the child can access such services) and/or controlling other aspects of the child's online experience.

Typical parental control techniques are often limited in their ability to control access across different computing devices and locations. For example, some parental control mechanisms are implemented on a device basis, requiring each protected computing device be updated with the parental control software. Other parental control mechanisms may be home-based or cloud-based. Again, however, such mechanisms are limited in controlling the child's online behavior and/or experiences in those situations in which the child is using a remote computing device outside the home or cloud control.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
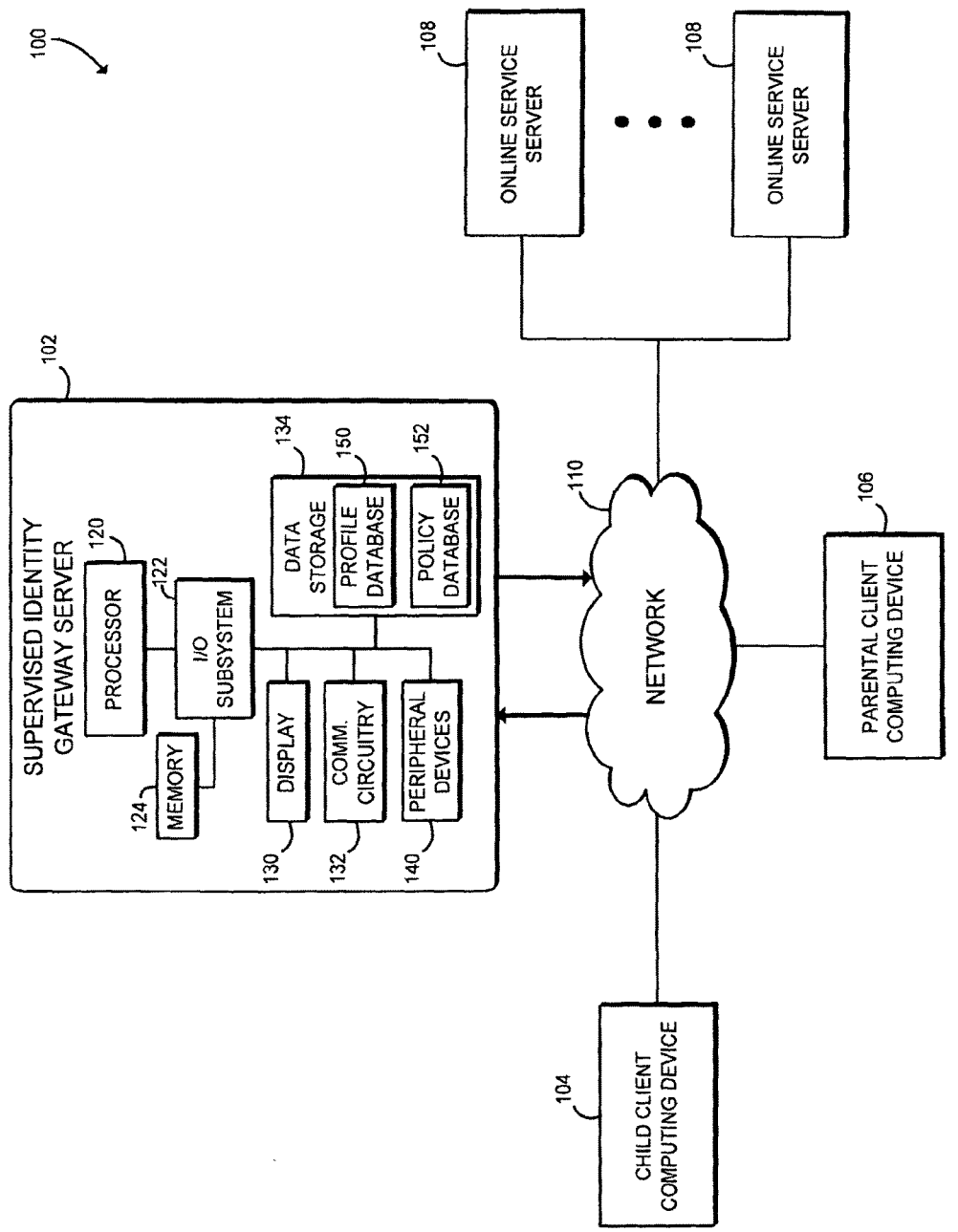
FIG. 1 is a simplified block diagram of at least one embodiment of a system for supervising an online identity.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for supervising an online identity includes a supervised identity gateway server 102, a "child" client computing device 104, a "parental" client computing device 106, and one or more online service servers 108. In use, as discussed in more detail below, the gateway server 102 manages an online identity of a user of the "child" client computing device 104 and facilitates access to one or more of the online service servers 108 for the user over a network 110. To do so, the gateway server 102 maintains access information for each of the registered online service servers 108. The access information is usable by the gateway server 102 to login the user of the client computing device 104 to a particular online service hosted by the one or more of the online service servers 108. For example, the access information may include a user password for the particular online service, which is kept confidential and inaccessible by the user of the client computing device 104. In this way, the gateway server 102 serves as a broker for the particular online services consumed by the user of the client computing device 104, which allows the gateway server 102 to maintain an amount of control over sensitive information (e.g., the user's identity information).

Additionally, the gateway server 102 monitors and controls the online activity between the client computing device 104 and the online service servers 108. For example, as discussed in more detail below, the gateway server 102 may control which online services, content, and/or activities are accessible to the user of the "child" client computing device 104 based on an access control policy (e.g., time of day, duration, white/black lists, purchase amounts, type of content, etc.). In some embodiments, the gateway server 102 may also monitor for alert events (e.g., a service requesting confidential information from the user of the client computing device 104, access of restricted content, etc.) and notify the "parental" client computing device 106 in response to detection of such an alert event.

The supervised identity gateway server 102 may be embodied as any type of server computing device, or collection of devices, capable of performing the functions described herein. For example, the gateway server 102 may be embodied as single server computer or multiple server computers. Additionally, in some embodiments, the gateway server 102 may be embodied as a "virtual server" formed from multiple computing devices distributed across the network 110. For example, the functionality provided by the gateway server 102 may be offered as part of a cloud-based service in some embodiments. Accordingly, although the gateway server 102 is illustrated in FIG. 1 and described below as embodied as a single server computing device, it should be appreciated that the gateway server 102 may be embodied as multiple devices cooperating together to facilitate the functionality described below. Additionally, in some embodiments, the supervised identity gateway server 102, or functional portions thereof, may be located in a home or business.

As shown in FIG. 1, the supervised identity gateway server 102 includes a processor 120, an input/output subsystem 122, a memory 124, a display 130, a communication circuit 132, a data storage device 134, and one or more peripheral devices 140. Of course, the gateway server 102 may include other or additional components, such as those commonly found in a server or other computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the gateway server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the gateway server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the gateway server 102, on a single integrated circuit chip.

The display 130 of the gateway server 102 may be embodied as any type of display capable of displaying digital information such as a liquid crystal display (LCD), a light emitting diode (LED), a plasma display, a cathode ray tube (CRT), or other type of display device. In some embodiments, the display 130 may be coupled with a touch screen to facilitate user interaction.

The communication circuit 132 of the gateway server 102 may be embodied as any communication circuit, device, or collection thereof, capable of enabling communications between the gateway server 102 and the "child" client computing device 104, the "parental" client computing device 106, and/or the one or more online service servers 108 via the network 110. The communication circuit 132 may be configured to use any one or more communication technology (e.g., wireless or wired communications) and associated protocols (e.g., Ethernet, Bluetooth®, Wi-Fi®, WiMAX, etc.) to effect such communication.

The data storage device 134 may be embodied as any type of device or devices configured for short-term or long-term storage of data such as, for example, memory devices and circuits, memory cards, hard disk drives, solid-state drives, or other data storage devices. In the illustrative embodiment of FIG. 1, the data storage 134 is shown as integral with the supervised identity gateway server 102; however, in other embodiments, the data storage 134 may be separate from the gateway server 102 but in communication therewith. For example, the data storage 134 may be maintained by a separate data server or the like.

The data storage 134 stores a profile database 150 and a policy database 152. As discussed in more detail below, the profile database 150 stores service access information 330 (see FIG. 3) for the various online service servers 108, which is usable by the gateway server 102 to login the user of the "child" client computing device 104 with the corresponding online service. The profile database 150 also stores an online identity profile 332 (see FIG. 3) of the user of the "child" client computing device 104. The online identity profile 332 includes identity information of the user, some of which may be kept secured and not shared with the online service servers 108.

The policy database 152 stores a set of policy rules 350 (see FIG. 3) used by the gateway server 102 to control the online activity between the "child" client computing device 104 and the online service servers 108. The policy rules 350 may be embodied as any type of policy rule usable by the gateway server 102 to monitor and control such activity including, for example, a white/black list of online services, an access control policy, a purchase transaction policy, and/or other policies and rules.

In some embodiments, the gateway server 102 may further include one or more peripheral devices 140. Such peripheral devices 140 may include any type of peripheral device commonly found in a server computing device such as a hardware keyboard, input/output devices, peripheral communication devices, and/or other peripheral devices.

The "child" client computing device 104 and the "parental" client computing device 106 may be embodied as any type of computing devices capable of performing the functions described herein. For example, each of the client computing devices 104, 106 may be embodied as, without limitation, a computer, a desktop computer, a workstation, a laptop computer, a notebook computer, a tablet computer, a smartphone, a distributed computing system, a multiprocessor system, a consumer electronic device, a smart television, a smart appliance, and/or other computing device. Each of the client computing devices 104, 106 may include components, such as a processor, memory, and I/O subsystem, similar to the components of the supervised identity gateway server 102 discussed above. The description of those components of the gateway server 102 apply equally to the corresponding components of the client computing devices 104, 106, which are not shown in FIG. 1 or separately described herein for clarity of the description.

In the illustrative embodiment, the client computing device 104 is operated by a child or other dependent of the user of the "parental" client computing device 106. As such, the designation of "child" and "parent" may be used throughout this specification with regard to the client computing device 104 and the client computing device 106, respectively. However, it should be appreciated that the user of the "child" client computing device 104 is not limited to the child of the user of the "parental" client computing device 106. Likewise, the user of the "parental" client computing device 106 is not limited to the parent of the user of the "child" client computing device 104. Rather, the users of the client computing devices 104, 106 may have relationships other than child-parent. That is, the user of the "child" client computing device 104 may be any user whose online identity and activities are to be monitored/controlled by the user of the "parental" client computing device 106. For example, in other embodiments, the user of the client computing device 104 may be an employee of the user of the client computing device 106 or otherwise have a relationship other than child-parent.

It should be appreciated that although the illustrative system 100 of FIG. 1 includes only one "child" client computing device 104 and one "parental" client computing device 106, the system 100 may include additional "child" client computing devices 104 and/or "parental" client computing device 106 in other embodiments. For example, the user of the "child" client computing device 104 may operate a first client computing device in one location (e.g., the home) and a second client computing device in second location (e.g., a friend's house). In such embodiments, each client computing device used by the "child" embodies the "child" client computing device 104, which is used to access the online service servers 108 via the gateway server 102. As such, the supervised identity and activity monitoring provided by the gateway server 102 is not limited to a particular "child" client computing device 104.

The online service servers 108 may be embodied as any type of server computing device, or collection of devices, capable of performing the functions described herein. For example, each of the online service servers 108 may be embodied as single server computer or multiple server computers. Additionally, in some embodiments, each online service server 108 may be embodied as a "virtual server" formed from multiple computing devices distributed across the network 110. Each online service server 108 provides a corresponding online service, which may be accessed by the "child" client computing device 104 via the supervised identity gateway server 102. The online service servers 108 may provide any type of online service including, but not limited to, social networking, network searching, gaming, information retrieval and dissemination, business, and/or other online service.

The network 110 may be embodied as any number of various wired and/or wireless communication networks. As such, the network 110 may include one or more networks, routers, switches, computers, and/or other intervening devices. For example, the network 110 may be embodied as or otherwise include one or more cellular networks, telephone networks, local or wide area networks, publicly available global networks (e.g., the Internet), or any combination thereof.

Figure 2:
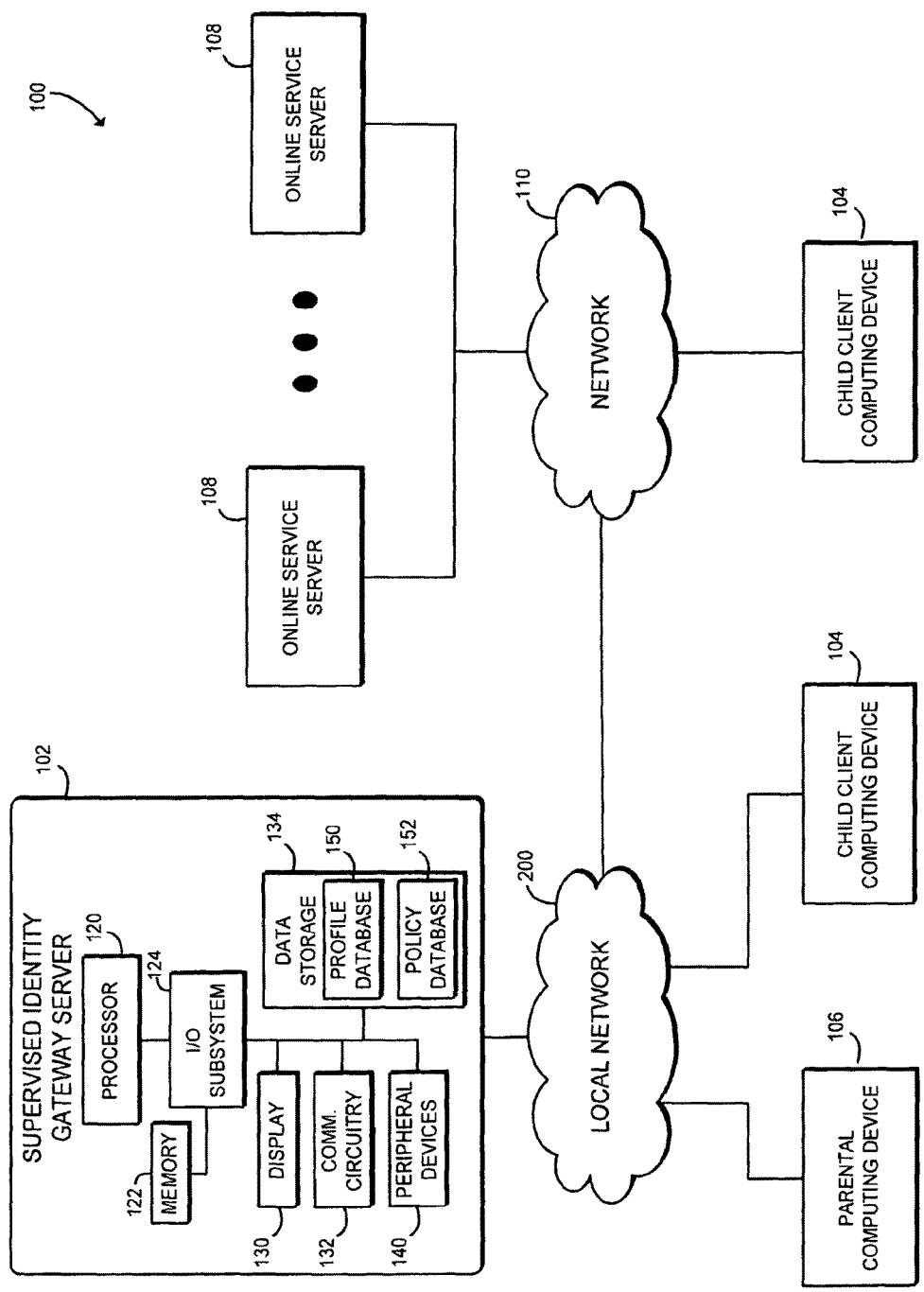
FIG. 2 is a simplified block diagram of at least one additional embodiment of a system for supervising an online identity.

In the system 100 of FIG. 1, the supervised identity gateway server 102 is located remotely from the "child" client computing device 104 and the "parental" client computing device 106. For example, in some embodiments, the gateway server 102 is located in the "cloud" and accessible over the network 110 (e.g., the Internet). However, in other embodiments as shown in FIG. 2, the supervised identity gateway server 102 may be embodied as a local server. For example, the gateway server 102 may be located in the same residence or house as the users of the client computing devices 104, 106. In such embodiments, the gateway server 102 may be accessible by the client computing devices 104, 106 via a local network 200, which may be embodied as, for example, a local area network (LAN) using any suitable communication technology and protocols (e.g., Ethernet, Wi-Fi, TCP/IP, etc.).

Additionally, in some embodiments, the local supervised identity gateway server 102 of FIG. 2 may be accessible even when the client computing devices 104, 106 are located remotely therefrom. For example, as shown in FIG. 2, the "child" client computing device 104 may be located remotely from the supervised identity gateway server 102 but access it via the network 110 and the local network 200. In this way, the user of the "child" client computing device 104 may continue to access the online service servers 108 through the gateway server 102 even when remote from the supervised identity gateway server 102 (e.g., when remote from the home serviced by the gateway server 102). Of course, in other embodiments, other system topologies may be used. In any such topologies, the supervised identity gateway server 102 is accessible by the "child" client computing device 104 to thereby access the online service servers 108 in a supervised manner as discussed in more detail below.

Figure 3:
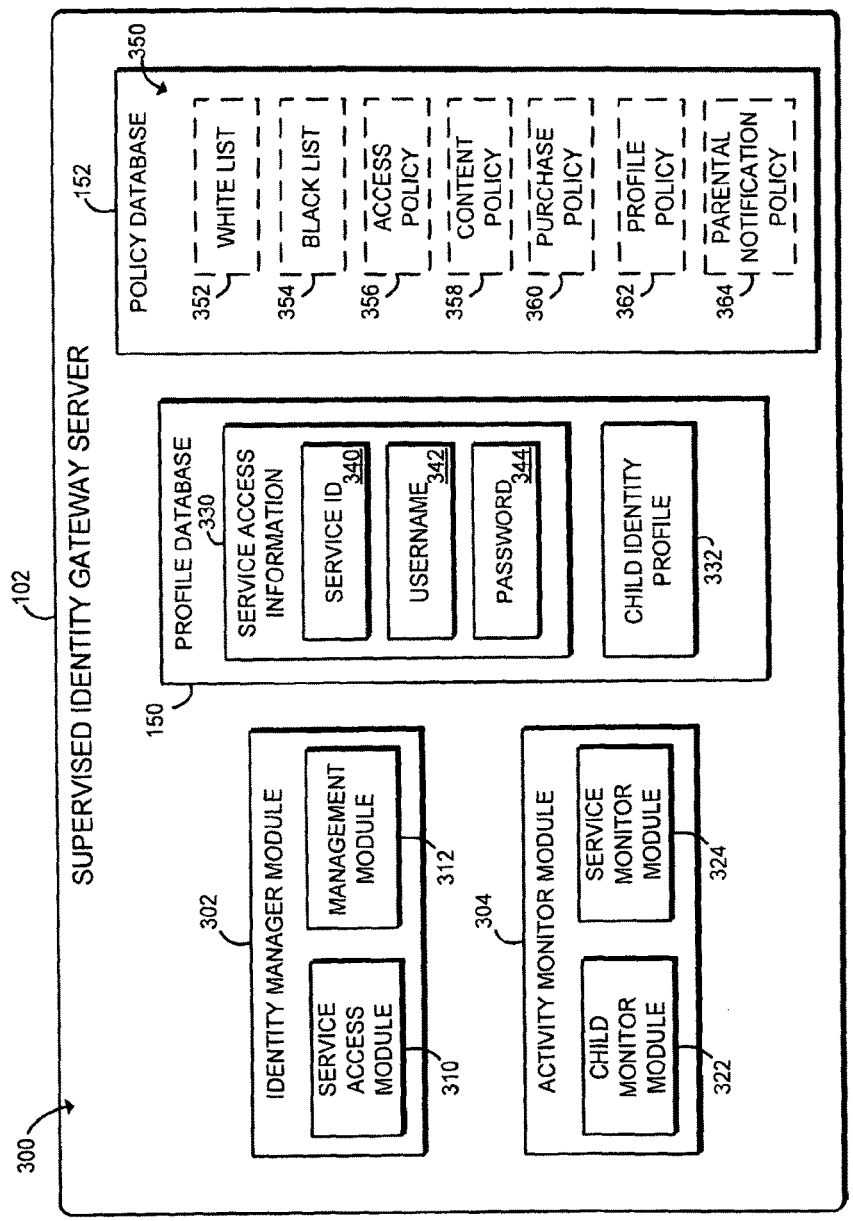
FIG. 3 is a simplified block diagram of at least one embodiment of an environment of a supervised identity gateway server of the system of FIG. 1 or 2.

Referring now to FIG. 3, in use, the supervised identity gateway server 102 establishes an environment 300. The environment 300 includes an identity manager module 302, an activity monitor module 304, the profile database 150, and the policy database 152. Each of the identity manager module 302, the activity monitor module 304, and other modules of the environment 300 may be embodied as software, firmware, hardware, or any combination thereof.

The identity manager module 302 manages the online identity of the user of the "child" client computing device 104 and facilitates access, including registration and login procedures, with the online service servers 108 while maintaining the desired online identity of the user. The identity manager module 302 includes a service access module 310 and a management module 312. The service access module 310 registers and accesses desired online services hosted by the online service servers 108 based on policy rules 350 (e.g., white/black lists) stored in the policy database 152. For example, if the user of the "child" client computing device 104 desires to register a new online service (e.g., a new social networking service), the service access module 310 facilities the registration process for the new online service. In so doing, the service access module 310 generates service access information 330 for the new online service, which is stored in the profile database 150. The service access information 330 may include, for example, a service identification 340 that identifies the service and/or the location (e.g., a Uniform Resource Locator, Internet Protocol address, etc.) of the corresponding online service server 108, a username for the particular service, and a password used to log into the online service server 108. To enable the supervision of the user of the "child" client computing device 104, the password 344 (and the username 342 in some embodiments) is kept secret and confidential from the user. That is, the password 344 and other information used to access the online service is inaccessible by the user of the "child" client computing device 104. In some embodiments, the supervised identity gateway server 102 generates the password 344 and/or username 342. For example, the gateway server 102 may randomly generate the password 344 or use some other function or method to generate the password 344 in a manner undiscoverable by the user of the "child" client computing device 104. Additionally, as discussed in more detail below, the gateway server 102 may transmit a notification or alert message to the "parental" client computing device 106 in response to the user of the "child" client computing device 104 attempting to register a new online service. Such notification may be in response to a determination that the requested new online service is unacceptable based on the policy database 152 as discussed below. Additionally or alternatively, in some embodiments, all new registrations requests are transmitted to the "parental" client computing device 106 for confirmation prior to registration. In this way, the supervised identity gateway server 102 maintains control over the user's online identity profile and activities as discussed in more detail below.

During the registration process, the management module 312 may manage the creation of an online identity for that particular online service based on a child identity profile 332 stored in the profile database 150 and policy rules 350 stored in the policy database 152. In some embodiments, the child identity profile 332 may include identity information that is to be kept secret from some or all online services and, as such, is not used in the registration process. Alternatively, default or ambiguous information may be used for particular identity information. In this way, the management module 312 may maintain control over the dissemination of identity information of the user of the "child" client computing device 104 and, in some embodiments, maintain a consistent online identity across various online services.

After an online service has been successfully registered, the service access module 310 may facilitate access to the registered online service in response to a request from the "child" client computing device 104. In doing so, the service access module 310 utilizes the service access information 330 to access the requested online service. Such access is, of course, dependent upon the policy rules 350 defined in the policy database 152, which may dictate the time of day, length of time, or other access parameters of the requested online service. The management module 312 may also respond to requests from the "parental" client computing device 106 to manage the online identity of the user of the "child" client computing device 104, manage the policies defined in the policy database 152, review activity logs of the client computing device 104, and/or otherwise facilitate management of the online supervision of the activities of the user of the "child" client computing device 104 provided by the gateway server 102.

The activity monitor module 304 monitors and controls the online activity between the "child" client computing device 104 and the online service servers 108. To do so, the activity monitor module 304 includes a child monitor module 322 and a service monitor module 324. The child monitor module 322 monitors the online activity of the "child" client computing device 104, and the service monitor module 324 monitors the online activity of the online service servers 108. The activity monitor module 304 monitors and controls such activity according to the policy rules 350 stored in the policy database 152.

As discussed above, the policy database 152 includes policy rules 350, which define the access and activity policies enforced by the identity manager module 302 and the activity monitor module 304. Each policy rule 350 may be embodied as any type of policy rule usable by the modules 302, 304 to monitor and control the online activities of the "child" client computing device 104 and/or the online service servers 108. For example, in the illustrative embodiment, the policy rules 350 includes a white list 352 and a black list 354. The white list 352 identifies those online services that have been deemed acceptable by the gateway server 102 (e.g., by the user of the "parental" client computing device 106), and the black list 354 identifies those online services that have been deemed unacceptable by the gateway server 102. As such, the identity manager module 302 will ignore any request to register an online service that is listed on the black list 354 and will authorize the registration of any online service listed on the white list 352. Any such denial or authorization of a requested new online service may cause the gateway server 102 to transmit a corresponding notification to the "parental" client computing device 106 as discussed in more detail below in regard to the parental notification policy 364.

The illustrative policy rules 350 also includes an access policy 356, a content policy 358, and a purchase policy 360. The access policy 356 defines policy rules that dictate various access parameters for allowing access by the "child" client computing device 104 to the online service servers 108 as a group or individually. For example, the access policy 356 may include policy rules that define the time of day an online service is accessible by the "child" client computing device 104, the length of time the online service is accessible, and/or other policies that dictate access parameters for the online services. Similarly, the content policy 358 defines policy rules that dictate which content is acceptable/unacceptable to be received by and/or transmitted from the "child" client computing device 104. The content policy 358 may identity acceptable/unacceptable content using any parameters including, for example, the type of content, metadata associated with the content, the source of the content, and/or other content parameters. If the activity monitor module 304 determines that the online service server 108 is attempting to deliver unacceptable content and/or the "child" client computing device 104 is attempting to transmit unacceptable content, the activity monitor module 304 may block such content and/or take other protective measures as discussed in more detail below. Similarly, the purchase policy 360 defines policy rules that dictate parameters of online purchase transactions that may be performed by the user of the "child" client computing device 104. For example, the purchase policy 360 may define a monetary limit for any online purchase, define a monetary limit above which requires authorization by the user of the "parental"

client computing device 106, define online services with which purchase transactions are acceptable/unacceptable, and/or other policy rules that control the types of online purchase transactions that may be performed by the user of the "child" client computing device 104.

The policy rules 350 also include a profile policy 362. The profile policy 362 defines policy rules that dictate which identity information of the user of the "child" client computing device 104 may be shared with the online service servers 108 and/or other users of such online services. As discussed above, the child identity profile 332 may include information that is not to be shared with online services, or otherwise not to be shared with particular online services. The particular identity information acceptable for sharing, and any other parameters related to the dissemination of identity information, may be identified by the profile policy 360.

In some embodiments, the policy rules 350 may also include a parental notification policy 364. The parental notification policy 364 defines various alert events, which may cause the supervised identity gateway server 102 to notify the user of the "parental" client computing device 106 and/or take other precautions (e.g., logging data) in response to such an alert event. The alert events defined by the parental notification policy 364 may be based on other policy rules 350 stored in the policy database 152. For example, if content identified as unacceptable by the content policy 358 is attempted to be transmitted to or from the "child" client computing device 104, the parent notification policy 364 may dictate that a notification be sent to the "parental" client computing device 106. Similarly, if the user of the "child" client computing device 104 attempts to register an online service listed in the black list 354, attempts to access an online service counter to the access policy 356, and/or attempts to perform an online purchase transaction greater than a limit identified in the purchase policy 360, the parental notification policy 364 may dictate that the user of the "parental" client computing device 106 be notified of such attempts. Of course, the parental notification policy 364 may include any additional or other types of policy rules that dictate when the user of the "parental" client computing device 106 is to be notified. That is, in some embodiments, alter notification/confirmations may be transmitted to the "parental" client computing device 106 on a per-event basis based on the parent notification policy 364 (i.e., the parent notification policy 364 may define each event that requires parental notification and/or confirmation prior to the event being allowed). Such notifications may be embodied as any type of notification including, but not limited to, an e-mail, a text message, a pre-recorded telephone call or voicemail, and/or other notification.

Figure 4:
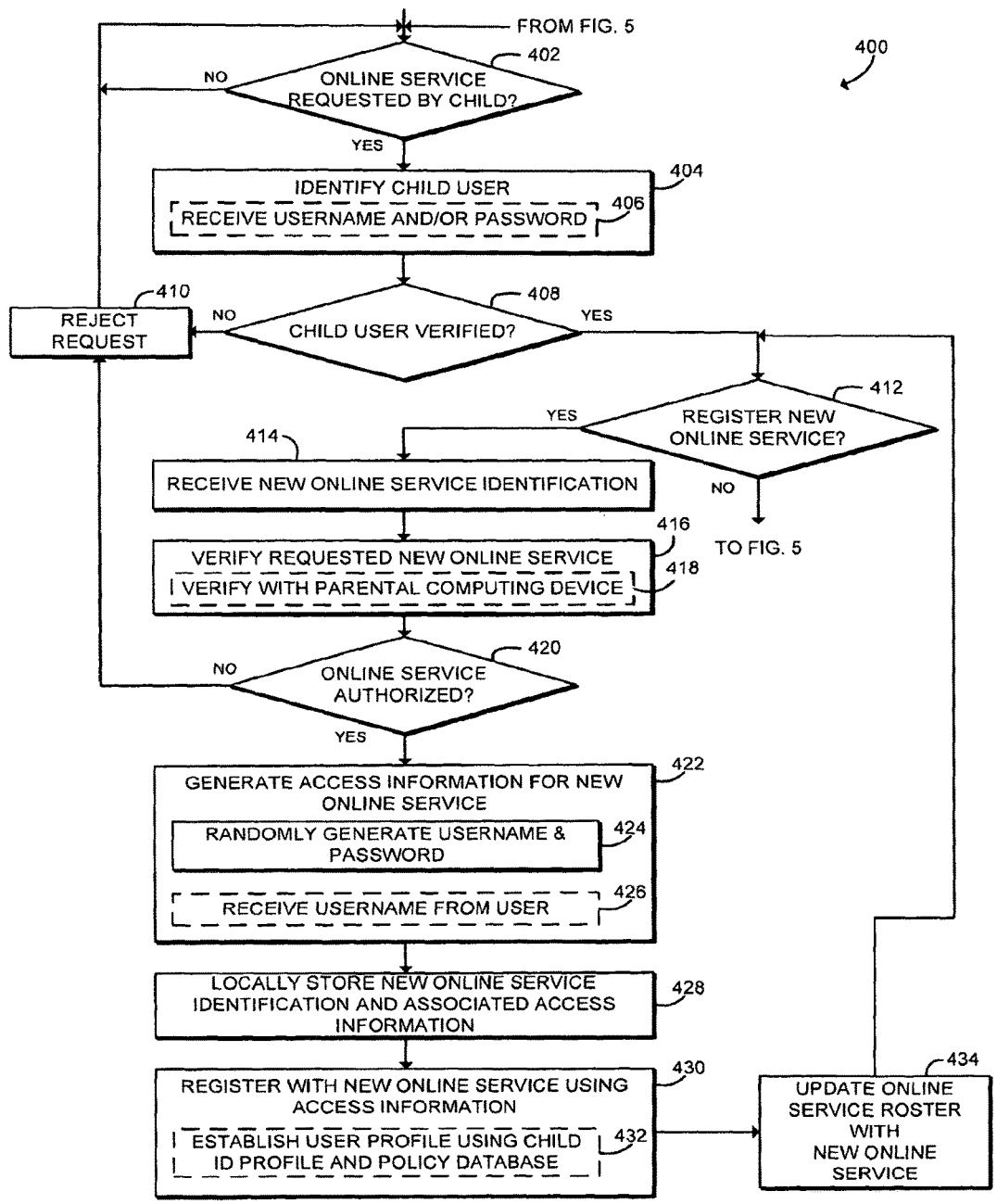
FIGS. 4-6 is a simplified flow diagram of at least one embodiment of a method for supervising an online identity that may be executed by the supervised identity gateway server of FIGS. 1-3.

Referring now to FIG. 4, in use, the supervised identity gateway server 102 may execute a method 400 for supervising the online identity and activity of the "child" client computing device 104. The method 400 begins with block 402 in which the supervised identity gateway server 102 determines whether a request for access to an online service has been received by the "child" client computing device 104. If so, the method 400 advances to block 404 in which the gateway server 102 identifies the user of the "child" client computing device 104. For example, as shown in block 406, the user of the "child" client computing device 104 may log into the gateway server 102 using a username and password or other log-in mechanic (e.g., a biometric, cryptographic token, etc.). Subsequently, in block 408, the gateway server determines whether the identity of the user of the "child" client computing device 104 is verified. If not, the method 400 advances to block 410 in which the gateway server 102 rejects the request for access to the desired online service. The method subsequently loops back to block 402 to await a further request for access to an online service.

If, however, the user of the "child" client computing device 104 is verified in block 408, the method 400 advances to block 412 in which the supervised identity gateway server 102 determines whether a request to register a new online service has been received from the client computing device 104. In the illustrative embodiment, a new online service must be registered with the supervised identity gateway server 102 before access to such online service is available to the user of the "child" client computing device 104. If a request to register a new online service is received, the method 400 advances to block 414 in which identification data for the requested new online service is received by the gateway server 102. The identification data may be embodied as any type of data that identifies the new online service and provides a mechanism through which the gateway server 102 can access the online service (i.e., the online service server 108 hosting the online service). For example, in the illustrative embodiment, the identification data includes a uniform resource locator (URL) and/or an Internet Protocol (IP) address for the online service server 108 hosting the service. Of course, the identification data may include other data, such as a name of the service, in some embodiments.

After the new online service identification data has been received from the "child" client computing device 104, the gateway server 102 verifies the new online service in block 416. To do so, the identity manager module 302 of the gateway server 102 may verify that the new online service is authorized using the policy rules 350 of the policy database 152. For example, the identity manager module 302 may compare the identification data of the new online service to the black list 354 to ensure the requested new online service has not been previously restricted. Additionally, the identity manager module 302 may compare the content available from the requested new online service to the content policy 358 to ensure the content is acceptable. Of course, the identity manager module 302 may utilize any one or more of the policy rules 350 to verify whether the requested new online service is authorized. In some embodiments, in block 418, the identity manager module 302 may communicate with the "parental" client computing device 106 to notify the user of that device 106 that a request for the new online service has been received from the "child" client computing device 104. In such embodiments, the identity manager module 302 may authorize the registration of the new online service in response to a confirmation or instructions from the "parental" client computing device 106 that the requested new online service is authorized.

If the gateway server 102 determines that the requested new online service is not authorized in block 420, the method 400 advances to block 410 in which the request to register the new online service is rejected. Additionally, in some embodiments, the gateway server 102 may transmit a notification to the "parental" client computing device 106 that the request for the new online service has been rejected.

If, however, the requested new online service is authorized in block 420, the method 400 advances to block 422 in which the gateway server 102 generates access information for the new online service. In addition to information required to access the online service (e.g., the URL of the online service), the access information may also include a username and/or password. The gateway server 102 may utilize any suitable algorithm or methodology to generate the access information. For example, as shown in block 424, the gateway server 102 may randomly generate the username and/or password for the requested online service. In other embodiments, the gateway server 102 may generate the username and password based on predetermined data (e.g., a pre-authorized password) provided by the user of the "parental" client computing device 106. Additionally, the generation of the access information may be dependent upon the requirements (e.g., password length and character requirements) of the requested online service. In some embodiments, the gateway server 102 may generate the password but receive the username from the user of the "child" client computing device 104 in block 426. Regardless, it should be appreciated that the gateway server 102 generates the access information, which is kept secret and confidential from the user of the "child" client computing device 104. As such, the user of the "child" client computing device 104 is incapable of accessing the online service (e.g., the newly created account) via other mechanisms, such a friend's computing device, because the access information is unknown to the user.

In block 428, the supervised identity gateway server 102 stores the access information for the new online service in the profile database. Again, the access information is stored on the gateway server 102 in a manner such that the access information is inaccessible by the user of the "child" client computing device 104. In block 430, the gateway server 102 registers an account with the new online service using the access information generated in block 422. Additionally, in some embodiments and depending on the type of online service, the gateway server 102 may establish a public profile on the online service for the user of the "child" client computing device in block 432. To do so, the gateway server 102 may utilize information contained in the child identity profile 332 of the profile database 150. Additionally, the gateway server 102 may determine which information of the child identity profile 332 to use to establish the public profile based on the policy rules 350 (e.g., the profile policy 362) of the policy database 152. In this way, more identity information of the user of the "child" client computing device 104 may be provided to trusted online services, while less identity information is provided to less trusted services.

After the supervised identity gateway server 102 has registered with the new online service in block 430, the gateway server 102 updates an online service roster with the newly registered online service in block 434. The online service roster may be embodied as a list of registered online services for which the user of the "child" client computing device is authorized to access. The gateway server 102 may store the online service roster in the profile database 150.

Figure 5:
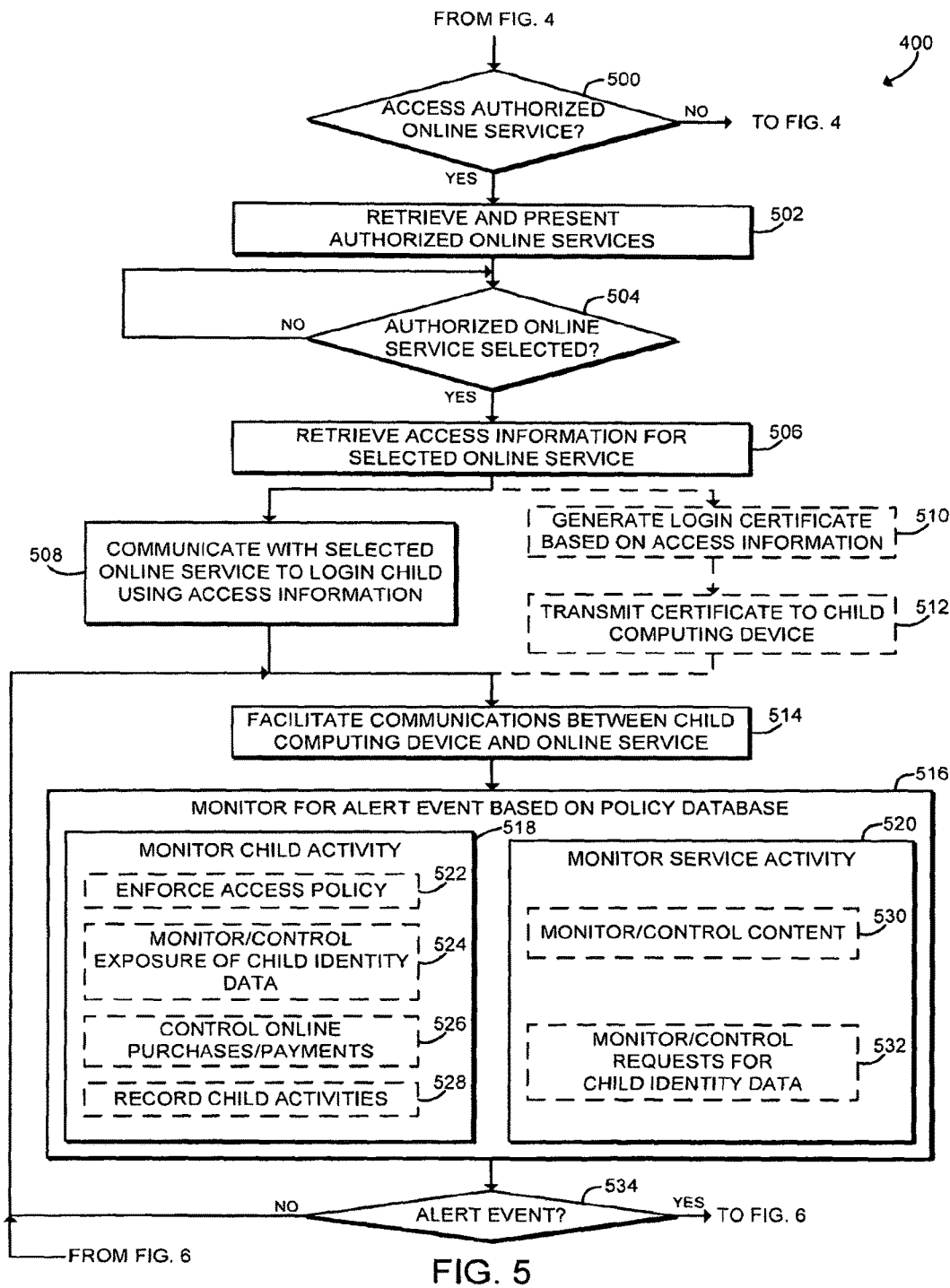

After the new online service has been added to the online service roster in block 434, the method 400 advances to block 412 in which the gateway server 102 determines if the user of the "child" client computing device 104 desires to register an additional new online service. If so, the method 400 again advances to block 414 to register the requested new online service as discussed above. However, if registration of a new online service is not requested in block 412, the method 400 advances to block 500 (see FIG. 5). In block 500, the supervised identity gateway server 102 determines whether a request to access an authorized online service has been received from the "child" client computing device 104. If not, the method 400 loops back to block 402 of FIG. 4 in which gateway server 102 determines whether a request to access online services has been received from the "child" client computing device 104. If, however, a request to access an authorized online service has been received from the "child" client computing device 104, the method 400 advances to block 502.

In block 502, the supervised identity gateway server 102 retrieves the online service roster of authorized online services from the profile database 150 and transmits the roster of the authorized online services to the "child" client computing device 104 for display to the user. The user of the "child" client computing device 104 may select the desired authorized online service to be accessed from the roster. Depending on the functionality of the "child" client computing device 104, any suitable selection methodology may be used to select the desired authorized online service.

If the gateway server 102 receives notification of a selection of an authorized online service from the "child" client computing device 104 in block 504, the method 400 advances to block 506 in which the gateway server 102 retrieves the access information for the selected authorized online service. As discussed above, the access information may be stored in the profile database and may include a service identification 340 (e.g., a URL or IP address), a username 342, and a password 344 in some embodiments. Additionally, as discussed above, the access information, or a portion thereof (e.g., the password 344), is kept secret from the user of the "child" client computing device 104.

After the access information for the selected authorized online service has been retrieved in block 506, the supervised identity gateway server 102 facilitates the login process to the requested online service using the access information. For example, in some embodiments, the gateway server 102 may communicate with the online service server 108 of the selected online service to login the user of the "child" client computing device 104 using the access information in block 508. In such embodiments, the gateway server 102 acts as a proxy for the "child" client computing device 104. However, as discussed above, the access information (or portion thereof) is kept confidential from the user of the "child" client computing device 104 during the login process.

Alternatively, in other embodiments, the supervised identity gateway server 102 may facilitate the login process by generating a login certificate based on the access information in block 510 and transmit the generated login certificate to the "child" client computing device 104 in block 512. The user of the "child" client computing device 104 may utilize the login certificate to log into the requested online service server 108. In such embodiments, the gateway server 102 may utilize any suitable cryptographic methodology to generate the login certificate based on the access information. Of course, the login certificate maintains the secrecy of the access information (or portion thereof) from the user of the "child" client computing device 104. Additionally, in some embodiments, the generated login certificates may be embodied as a one-use-only certificate, be configured to expire after a predetermined amount of time, and/or include other protection mechanisms.

After the user of the "child" client computing device 104 has been logged into the requested online service, the supervised identity gateway server 102 facilitates communicates between the "child" client computing device 104 and the online service server 108 of the requested online service. As such, in some embodiments, all communications between the "child" client computing device 104 and the online service server(s) 108 is transferred through the gateway server 102 or otherwise accessible by the gateway server 102. While facilitating such communications, the gateway server 102 monitors for any alert events in block 516 based on the communications. To do so, the gateway server 102 may analyze the communications for such alert events using the policy rules 350 of the policy database 152.

In block 518, the gateway server 102 may monitor for an alert event by monitoring the online activity of the user of the "child" client computing device 104 using the policy rules 350. For example, the gateway server 102 may enforce the access policy 356 in block 522. As discussed above, the access policy 356 may dictate when (e.g., day and/or time of day) the user of the "child" client computing device 104 can access the particular authorized online service, the duration for which the user may access the authorized online service, and/or other criteria that controls the accessibility of the authorized online service by the user of the "child" client computing device 104. Additionally, in block 524, the gateway server 102 may monitor and control the exposure of identity data of the user of the "child" client computing device 104 using the profile policy 362. To do so, the gateway server 102 may monitor communicates sent from the "child" client computing device 104 for those that include identification data of the user of the "child" client computing device 104 that is determined to be restricted based on the profile policy 362 (e.g., address information, full legal name, etc.). Additionally, in block 526, the gateway server 102 may control online purchase and payment transactions based on the purchase policy 360. For example, the gateway server 102 may ensure that any online purchase by the "child" client computing device 104 is below a threshold monetary amount dictated by the purchase policy 360. In some embodiments, the gateway server 102 may also record the online activity of the user of the "child" client computing device 104 in block 528. For example, the gateway server 102 may record the communications sent and received by the "child" client computing device 104. Such recording of online activities may be based on the policy rules 350 and occur continuously or in response to detection of an alert event as defined by the policy rules 350.

In block 520, the gateway server 102 may also monitor for an alert event by monitoring the online activity of the online service server 108 using the policy rules. For example, the gateway server 102 may monitor and/or control the access to content provided by the online service in block 530. To do so, the gateway server 102 may monitor the content delivered by the online service server 108 to determine whether such content is unauthorized content (e.g., adult content) based on the content policy 358. Additionally, in block 532, the gateway server 102 may monitor and/or control requests for identity data of the user of the "child" client computing device 104 based on the profile policy 362 of the policy database 152. For example, the gateway server 102 may monitor for requests of identification data of the child identity profile 332 that has been identified as restricted or private (e.g., address information, full legal name, etc.).

Figure 6:
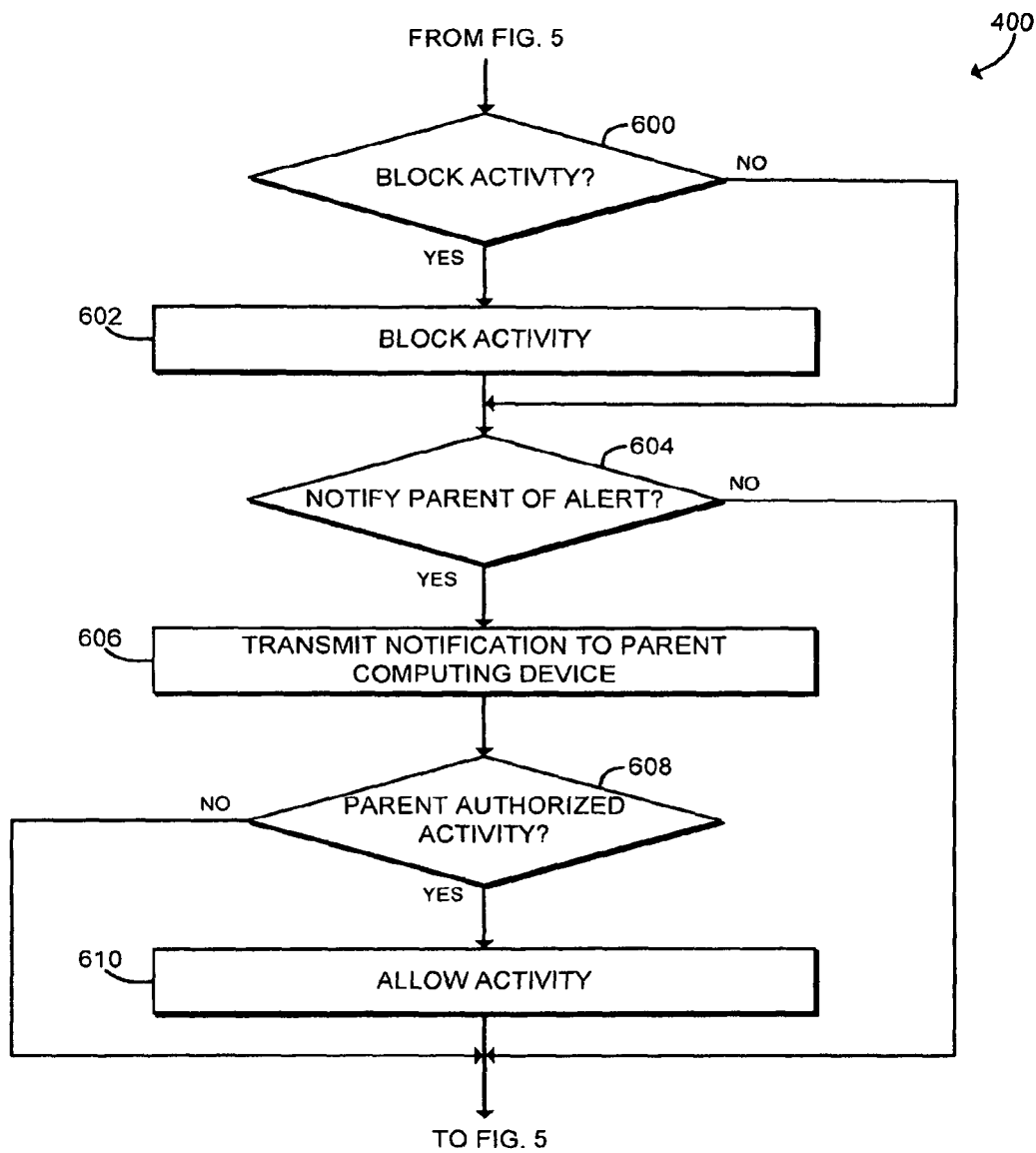

Of course, it should be appreciated that the gateway server 102 may monitor the activities of the "child" client computing device 104 and/or the online service server(s) 108, based on any policy rule 350 of the policy database to determine whether an alert event has occurred in block 516. If, in block 534, the gateway server 102 determines that no alert event has occurred, the method 400 loops back to block 514 in which the gateway server 102 continues to facilitate communications between the "child" client computing device 104 and the online service server 108. If, however, the gateway server 102 determines that an alert event has occurred, the method 400 advances to block 600 (see FIG. 6). In block 600, the gateway server 102 determines whether the activity generating the alert event should be blocked. That is, the policy rules 350 may dictate whether the activity prompting the alert event is to be blocked. For example, if the gateway server 102 determines that unauthorized content is being sent from the online service server 108 based on the content policy 358, the gateway server 102 may block the content in block 602 in response to the content policy 358 prescribing such blocking action.

If the activity generating the alert event is not to be blocked in block 600 or after the activity has been blocked in block 602, the method 400 advances to block 604 in which the gateway server 102 determines whether to notify the "parental" client computing device 106 of the alert event. The notification of the "parental" client computing device 106 may be defined by the parental notification policy 364 and/or other policies of the policy rules 350 of the policy database 152. As such, some alert events may trigger notification of the "parental" client computing device 106, while others do not. If the gateway server 102 determines that the "parental" client computing device 106 is to be notified in block 604, the method 400 advances to block 606 in which the gateway server 102 transmits a notification to the "parental" client computing device 106. Such notification may notify the user of the "parental" client computing device 106 that the alert event has occurred and/or has been blocked. In some embodiments, the user of the "parental" client computing device 106 may override the blocking of the alert event or otherwise authorize the activity that prompted the alert event in block 608. If the user of the "parental" client computing device 106 authorized the activity prompting the alert event, the method 400 advances to block 610 in which the gateway server 102 allows the activity. For example, if the gateway server 102 previously blocked the activity, the activity is unblocked in block 610. After the activity has been allowed 610 or the activity has not been authorized in block 608, the method 400 loops back to block 514 (see FIG. 5) in which the gateway server 102 continues to facilitate communications between the "child" client computing device 104 and the online service server(s) 108.

Figure 7:
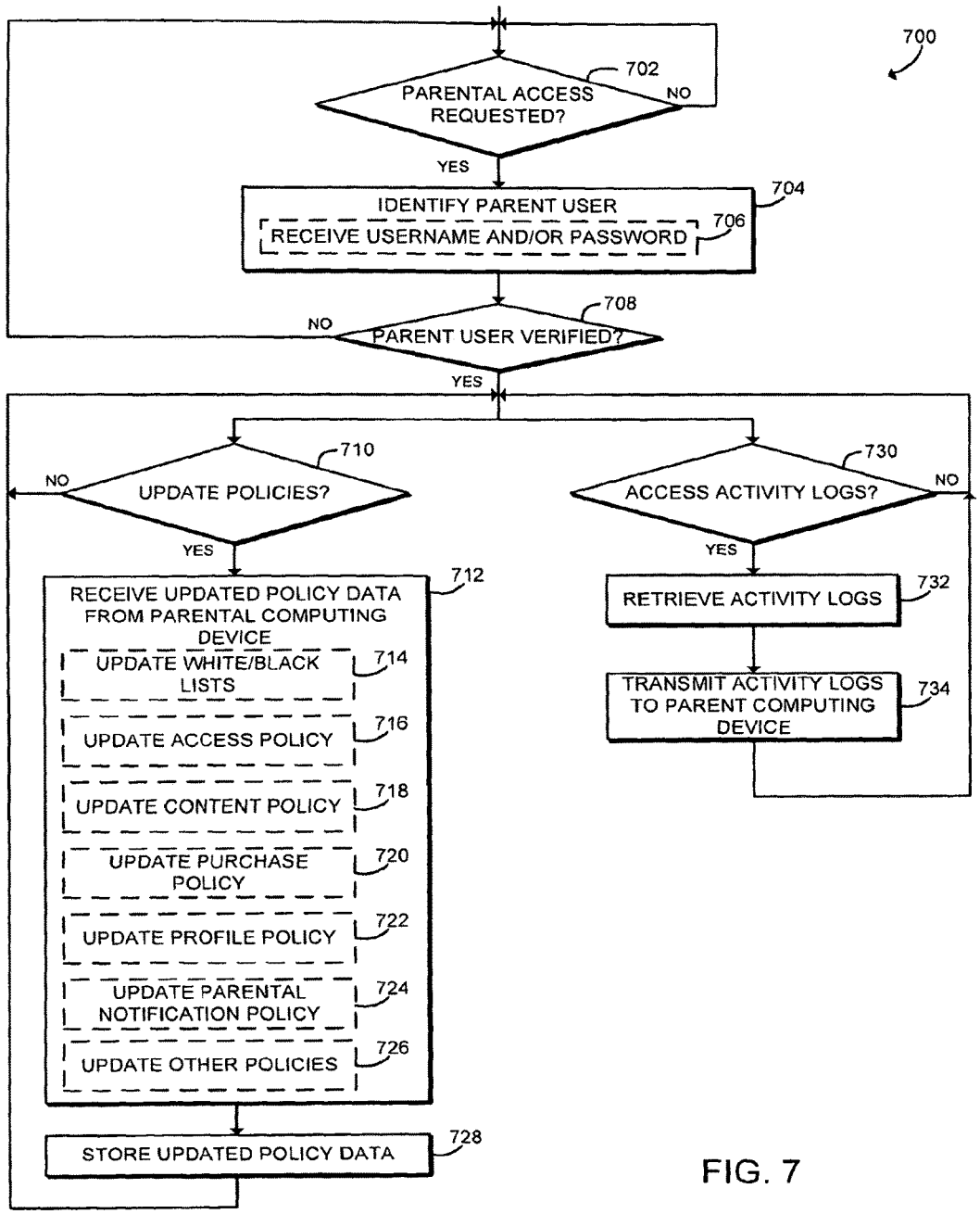
FIG. 7 is a simplified flow diagram of at least one embodiment of a method for managing the supervision of the online identity performed by the supervised identity gateway server.

Referring now to FIG. 7, in some embodiments, the supervised identity gateway server 102 may facilitate management of the identity supervision by the "parental" client computing device 106. To do so, the gateway server 102 may execute a method 700 for managing the supervision of the online identity. The method 700 begins with block 702 in which the gateway server 102 determines whether a request for access has been received from the "parental" client computing device 106. If so, the method 700 advances to block 704 in which the gateway server 102 identifies the user of the "parental" client computing device 106. For example, as shown in block 706, the user of the "parental" client computing device 106 may log into the gateway server 102 using a username and password or other log-in mechanic (e.g., a biometric, cryptographic token, etc.). Subsequently, in block 708, the gateway server 102 determines whether the user of the "parental" client computing device 106 is verified. If not, the request for access is denied, and the method 700 loops back to block 702 to await a further request for access.

If, however, the user of the "parental" client computing device 106 is verified in block 708, the method 700 advances to block 710 and block 730. In block 710, the gateway server 102 determines whether the user of the "parental" client computing device 106 desires to update the policy rules 350 of the policy database 152. If so, the method 700 advances to block 712 in which the gateway server 102 receives updated policy data from the "parental" client computing device 106. For example, the gateway server 102 may recited updated white and/or black list policy data in block 714, updated access policy data in block 716, updated content policy data in bloc 718, updated purchase policy data in block 720, updated profile policy data in block 722, updated parental notification policy data in block 724, and/or other updated policy data in block 726. The particular updated policy data and format thereof may depend on the particular policy being updated and/or other criteria. Regardless, in block 728, the gateway server 102 stores the updated policy data in the policy database 152. After the updated policy data has been locally stored, the method 700 loops back to blocks 710, 730.

In block 730, the gateway server 102 determines whether the user of the "parental" client computing device 106 desires to access activity logs recorded by the gateway server 102. As discussed above, the gateway server 102 may record the online activity of the user of the "child" client computing device 104 and/or the accessed online services. Such activity may include, for example, the communications between the "child" client computing device 104 and the online service server 108. If the a request for the activity logs is received in block 730, the gateway server retrieves the requested activity logs in block 732 and transmits the activities logs to the "parental" client computing device 106 in block 734. The method 700 subsequently loops back to blocks 710, 730 to monitor for requests to update the policy database 152 and/or access to the activity logs as discussed above.

EXAMPLES

Illustrative examples of the technologies disclosed herein are provided below. An embodiment of the technologies may include any one or more, and any combination of, the examples described below.

Example 1 includes a gateway server to facilitate supervision of an online identity, the gateway server comprising a profile database to store access information to online services of a user of a client computing device, wherein the access information is inaccessible by the user of the client computing device; a policy database to store a set of policy rules that define authorized activity between the client computing device and the online services; an identity manager module to (i) receive a request for access to an online service from the client computing device, (ii) retrieve, in response to the request, access information to the online service from the profile database, and (iii) facilitate access to the online service for the client computing device using the access information; and an activity monitor module to control activity between the client computing device and the online service based on the set of policy rules.

Example 2 includes the subject matter of Example 1, and wherein to receive the request for access to the online service comprises to retrieve identification data of available authorized online services from a database of the gateway server; transmit the identification data of the available authorized online services to the client computing device; and receive a selection of one of the available authorized online services from the client computing device.

Example 3 includes the subject matter of any of Examples 1 and 2, and wherein to retrieve the access information comprises to retrieve login information usable by the gateway server to login the user of the client computing device with the online service.

Example 4 includes the subject matter of any of Examples 1-3, and wherein the login information comprises at least one of a password or a username usable to login the user of the client computing device with the online service.

Example 5 includes the subject matter of any of Examples 1-4, and wherein the at least one of the password or username was previously randomly generated by the gateway server.

Example 6 includes the subject matter of any of Examples 1-5, and wherein access to the online service comprises logging a user of the client computing device into the online service using the access information while keeping the access information secret from the client computing device.

Example 7 includes the subject matter of any of Examples 1-6, and wherein to facilitate access to the online service comprises to generate a login certificate based on the access information, the login certificate usable by the client computing device to log into the online service.

Example 8 includes the subject matter of any of Examples 1-7, and wherein to facilitate access to the online service comprises to facilitate network communications between the client computing device and the online service.

Example 9 includes the subject matter of any of Examples 1-8, and wherein to control activity between the client computing device and the online service comprises to control access to the online service by the client computing device according to an access control policy of the policy database.

Example 10 includes the subject matter of any of Examples 1-9, and wherein the access control policy defines at least one of (i) a period of time during which the client computing device may access the online service or (ii) a duration of time during which the client computing device may access the online service.

Example 11 includes the subject matter of any of Examples 1-10, and wherein to control activity between the client computing device and the online service comprises to control the disclosure of identity profile information of the user of the client computing device to the online service based on a profile disclosure policy of the policy database.

Example 12 includes the subject matter of any of Examples 1-11, and wherein to control the disclosure of identity profile information comprises to block a request for identity profile information received from the online service.

Example 13 includes the subject matter of any of Examples 1-12, and wherein to control activity between the client computing device and the online service comprises to control an online payment transaction between the client computing device and the online service based on a purchase transaction policy of the policy database.

Example 14 includes the subject matter of any of Examples 1-13, and wherein to control the online payment transaction comprises to block the online payment transaction in response to a determination that a currency amount of the online payment transaction is greater than a threshold currency amount defined in the purchase transaction policy.

Example 15 includes the subject matter of any of Examples 1-14, and wherein to control activity between the client computing device and the online service comprises to generate a data log indicative of activities between the client computing device and the online service.

Example 16 includes the subject matter of any of Examples 1-15, and wherein to control activity between the client computing device and the online service comprises to control content delivered by online service based on a content policy of the policy database.

Example 17 includes the subject matter of any of Examples 1-16, and wherein to control the content delivered by the online service comprises to block access to the content by the client computing device in response to the content correlating to reference content identified in the content policy.

Example 18 includes the subject matter of any of Examples 1-17, and wherein to control activity between the client computing device and the online service comprises to monitor the activity for an occurrence of an alert event and to generate an alert in response to the occurrence of the alert event.

Example 19 includes the subject matter of any of Examples 1-18, and wherein the alert event comprises at least one of: (i) a request by the online service for identity profile information of the user of the client computing device, (ii) initiation of purchase transaction, or (iii) delivery of content by the online service identified as unacceptable based on a content policy.

Example 20 includes the subject matter of any of Examples 1-19, and wherein to control activity between the client computing device and the online service further comprises to block the alert event.

Example 21 includes the subject matter of any of Examples 1-20, and wherein to generate the alert comprises to transmit a notification to another client computing device that informs a user of the another computing device of the occurrence of the alert event.

Example 22 includes the subject matter of any of Examples 1-21, and wherein the activity monitor module is further to receive authorization for the alert event from the another computing device in response to transmission of the notification; and allow the alert event to occur in response to receipt of the authorization.

Example 23 includes the subject matter of any of Examples 1-22, and wherein the identity manager module is further to receive, from the client computing device, a request to register a new online service with the gateway server; receive identification data that identifies the new online service; generate new access information to access the new online service; and store the new access information in the profile database such that the new access information is inaccessible by the user the client computing device.

Example 24 includes the subject matter of any of Examples 1-23, and wherein to generate the new access information comprises to randomly generate a password usable to access the new online service.

Example 25 includes the subject matter of any of Examples 1-24, and wherein to generate the new access information comprises to randomly generate a username associated with the password.

Example 26 includes the subject matter of any of Examples 1-25, and wherein the identity manager module is further to register the user of the client computing device with the new online service using the new access information.

Example 27 includes the subject matter of any of Examples 1-26, and wherein the identity manager module is further to determine whether the new online service is authorized based on the identification data and a policy rule of the policy database.

Example 28 includes the subject matter of any of Examples 1-27, and wherein the identity manager module is further to receive a management access request from another client computing device; verify the identity of a user of the another client computing device; and update the set of policy rules stored in the policy database based on data received from the another client computing device.

Example 29 includes the subject matter of any of Examples 1-28, and wherein the identity manager module is further to receive, from the another client computing device, a request for an activity log of the activity between the client computing device and the online service; and transmit the activity log to the another client computing device.

Example 30 includes a method for supervising an online identity, the method comprising receiving, on a gateway server, a request for access to an online service from a client computing device; retrieving, in response to the request, access information to the online service from a profile database of the gateway server; facilitating, with the gateway server, access to the online service for a user of the client computing device using the access information, wherein the access information is inaccessible by the user of the client computing device; controlling, with the gateway server, activity between the client computing device and the online service based on a set of policy rules stored in a policy database of the gateway server.

Example 31 includes the subject matter of Example 30, and wherein receiving a request for access to the online service comprises retrieving identification data of available authorized online services from a database of the gateway server; transmitting the identification data of the available authorized online services to the client computing device; and receiving a selection of one of the available authorized online services from the client computing device.

Example 32 includes the subject matter of any of Examples 30 and 31, and wherein retrieving the access information comprises retrieving login information usable by the gateway server to login the user of the client computing device with the online service.

Example 33 includes the subject matter of any of Examples 30-32, and wherein the login information comprises at least one of a password or a username usable to login the user of the client computing device with the online service.

Example 34 includes the subject matter of any of Examples 30-33, and wherein the at least one of the password or username was previously randomly generated by the gateway server.

Example 35 includes the subject matter of any of Examples 30-34, and wherein facilitating access to the online service comprises logging a user of the client computing device into the online service using the access information while keeping the access information secret from the client computing device.

Example 36 includes the subject matter of any of Examples 30-35, and wherein facilitating access to the online service comprises generating a login certificate based on the access information, the login certificate usable by the client computing device to log into the online service.

Example 37 includes the subject matter of any of Examples 30-36, and wherein facilitating access to the online service comprises facilitating network communications between the client computing device and the online service.

Example 38 includes the subject matter of any of Examples 30-37, and wherein controlling activity between the client computing device and the online service comprises controlling access to the online service by the client computing device according to an access control policy of the gateway server.

Example 39 includes the subject matter of any of Examples 30-38, and wherein the access control policy defines at least one of (i) a period of time during which the client computing device may access the online service or (ii) a duration of time during which the client computing device may access the online service.

Example 40 includes the subject matter of any of Examples 30-39, and wherein controlling activity between the client computing device and the online service comprises controlling the disclosure of identity profile information of the user of the client computing device to the online service based on a profile disclosure policy of the gateway server.

Example 41 includes the subject matter of any of Examples 30-40, and wherein controlling the disclosure of identity profile information comprises blocking a request for identity profile information received from the online service.

Example 42 includes the subject matter of any of Examples 30-41, and wherein controlling activity between the client computing device and the online service comprises controlling an online payment transaction between the client computing device and the online service based on a purchase transaction policy of the gateway server.

Example 43 includes the subject matter of any of Examples 30-42, and wherein controlling the online payment transaction comprises blocking the online payment transaction in response to a currency amount of the online payment transaction being greater than a threshold currency amount defined in the purchase transaction policy.

Example 44 includes the subject matter of any of Examples 30-43, and wherein controlling activity between the client computing device and the online service comprises generating a data log indicative of activities between the client computing device and the online service.

Example 45 includes the subject matter of any of Examples 30-44, and wherein controlling activity between the client computing device and the online service comprises controlling content delivered by online service based on a content policy of the gateway server.

Example 46 includes the subject matter of any of Examples 30-45, and wherein controlling the content delivered by the online service comprises blocking access to the content by the client computing device in response to the content correlating to reference content identified in the content policy.

Example 47 includes the subject matter of any of Examples 30-46, and wherein controlling activity between the client computing device and the online service comprises monitoring the activity for the occurrence of an alert event and generating an alert in response to the occurrence of the alert event.

Example 48 includes the subject matter of any of Examples 30-47, and wherein the alert event comprises at least one of: (i) a request by the online service for identity profile information of the user of the client computing device, (ii) initiation of purchase transaction, or (iii) delivery of content by the online service identified as unacceptable based on a content policy.

Example 49 includes the subject matter of any of Examples 30-48, and further including blocking the alert event.

Example 50 includes the subject matter of any of Examples 30-49, and wherein generating the alert comprises transmitting a notification to another client computing device that informs a user of the another computing device of the occurrence of the alert event.

Example 51 includes the subject matter of any of Examples 30-50, and further including receiving authorization for the alert event from the another computing device in response to transmitting the notification; and allowing the alert event to occur in response to receiving of the authorization.

Example 52 includes the subject matter of any of Examples 30-51, and further including receiving, from the client computing device, a request to register a new online service with the gateway server; receiving identification data identifying the new online service; generating new access information to access the new online service; and storing the new access information on the gateway server such that the new access information is inaccessible by the user the client computing device.

Example 53 includes the subject matter of any of Examples 30-52, and wherein generating new access information comprises randomly generating a password usable to access the new online service.

Example 54 includes the subject matter of any of Examples 30-53, and wherein generating new access information comprises randomly generating a username associated with the password.

Example 55 includes the subject matter of any of Examples 30-54, and further including registering the user of the client computing device with the new online service using the new access information.

Example 56 includes the subject matter of any of Examples 30-55, and further including determining whether the new online service is authorized based on the identification data and a policy rule of a policy database maintained by the gateway server.

Example 57 includes the subject matter of any of Examples 30-56, and further including receiving, on the gateway server, a management access request from another client computing device; verifying the identity of a user of the another client computing device; and updating the set of policy rules stored in the policy database based on data received from the another client computing device.

Example 58 includes the subject matter of any of Examples 30-57, and further including receiving, on the gateway server, a request for an activity log of the activity between the client computing device and the online service; and transmitting the activity log to the another client computing device.

Example 59 includes a computing device comprising a processor, and a memory having stored therein a plurality of instructions that when executed by the processor cause the computing device to perform the method of any of Examples 30-58.

Example 60 includes one or more machine readable storage media comprising a plurality of instructions stored thereon that in response to being executed result in a computing devirt performing the method of any of Examples 30-58.

Example 61 includes a computing device comprising means for performing the method of any of Examples 30-58.

Example 61 includes a computing device to facilitate supervision of an online identity, the computing device comprising means for receiving a request for access to an online service from a client computing device; means for retrieving access information to the online service from a profile database of the gateway server; means for facilitating access to the online service for a user of the client computing device using the access information, wherein the access information is inaccessible by the user of the client computing device; means for controlling activity between the client computing device and the online service based on a set of policy rules stored in a policy database of the gateway server.

Example 62 includes the subject matter of Example 61, and wherein the means for receiving a request for access to the online service comprises means for retrieving identification data of available authorized online services from a database of the gateway server; means for transmitting the identification data of the available authorized online services to the client computing device; and means for receiving a selection of one of the available authorized online services from the client computing device.

Example 63 includes the subject matter of any of Examples 61 and 62, and wherein the means for retrieving the access information comprises means for retrieving login information usable by the gateway server to login the user of the client computing device with the online service.

Example 64 includes the subject matter of any of Examples 61-63, and wherein the login information comprises at least one of a password or a username usable to login the user of the client computing device with the online service.

Example 65 includes the subject matter of any of Examples 61-64, and wherein the at least one of the password or username was previously randomly generated by the gateway server.

Example 66 includes the subject matter of any of Examples 61-65, and wherein means for facilitating access to the online service comprises means for logging a user of the client computing device into the online service using the access information while keeping the access information secret from the client computing device.

Example 67 includes the subject matter of any of Examples 61-66, and wherein means for facilitating access to the online service comprises means for generating a login certificate based on the access information, the login certificate usable by the client computing device to log into the online service.

Example 68 includes the subject matter of any of Examples 61-67, and wherein means for facilitating access to the online service comprises means for facilitating network communications between the client computing device and the online service.

Example 69 includes the subject matter of any of Examples 61-68, and wherein means for controlling activity between the client computing device and the online service comprises means for controlling access to the online service by the client computing device according to an access control policy of the gateway server.

Example 70 includes the subject matter of any of Examples 61-69, and wherein the access control policy defines at least one of (i) a period of time during which the client computing device may access the online service or (ii) a duration of time during which the client computing device may access the online service.

Example 71 includes the subject matter of any of Examples 61-70, and wherein means for controlling activity between the client computing device and the online service comprises means for controlling the disclosure of identity profile information of the user of the client computing device to the online service based on a profile disclosure policy of the gateway server.

Example 72 includes the subject matter of any of Examples 61-71, and wherein means for controlling the disclosure of identity profile information comprises means for blocking a request for identity profile information received from the online service.

Example 73 includes the subject matter of any of Examples 61-72, and wherein means for controlling activity between the client computing device and the online service comprises means for controlling an online payment transaction between the client computing device and the online service based on a purchase transaction policy of the gateway server.

Example 74 includes the subject matter of any of Examples 61-73, and wherein means for controlling the online payment transaction comprises means for blocking the online payment transaction in response to a currency amount of the online payment transaction being greater than a threshold currency amount defined in the purchase transaction policy.

Example 75 includes the subject matter of any of Examples 61-74, and wherein means for controlling activity between the client computing device and the online service comprises means for generating a data log indicative of activities between the client computing device and the online service.

Example 76 includes the subject matter of any of Examples 61-75, and wherein means for controlling activity between the client computing device and the online service comprises means for controlling content delivered by online service based on a content policy of the gateway server.

Example 77 includes the subject matter of any of Examples 61-76, and wherein means for controlling the content delivered by the online service comprises means for blocking access to the content by the client computing device in response to the content correlating to reference content identified in the content policy.

Example 78 includes the subject matter of any of Examples 61-77, and wherein means for controlling activity between the client computing device and the online service comprises means for monitoring the activity for the occurrence of an alert event and generating an alert in response to the occurrence of the alert event.

Example 79 includes the subject matter of any of Examples 61-78, and wherein the alert event comprises at least one of: (i) a request by the online service for identity profile information of the user of the client computing device, (ii) initiation of purchase transaction, or (iii) delivery of content by the online service identified as unacceptable based on a content policy.

Example 80 includes the subject matter of any of Examples 61-79, and further including means for blocking the alert event.

Example 81 includes the subject matter of any of Examples 61-80, and wherein means for generating the alert comprises means for transmitting a notification to another client computing device that informs a user of the another computing device of the occurrence of the alert event.

Example 82 includes the subject matter of any of Examples 61-81, and further including means for receiving authorization for the alert event from the another computing device in response to transmitting the notification; and means for allowing the alert event to occur in response to receiving of the authorization.

Example 83 includes the subject matter of any of Examples 61-82, and further including means for receiving, from the client computing device, a request to register a new online service with the gateway server; means for receiving identification data identifying the new online service; means for generating new access information to access the new online service; and means for storing the new access information on the gateway server such that the new access information is inaccessible by the user the client computing device.

Example 84 includes the subject matter of any of Examples 61-83, and wherein means for generating new access information comprises means for randomly generating a password usable to access the new online service.

Example 85 includes the subject matter of any of Examples 61-84, and wherein means for generating new access information comprises means for randomly generating a username associated with the password.

Example 86 includes the subject matter of any of Examples 61-85, and further including means for registering the user of the client computing device with the new online service using the new access information.

Example 87 includes the subject matter of any of Examples 61-86, and further including means for determining whether the new online service is authorized based on the identification data and a policy rule of a policy database maintained by the gateway server.

Example 88 includes the subject matter of any of Examples 61-87, and further including means for receiving a management access request from another client computing device; means for verifying the identity of a user of the another client computing device; and means for updating the set of policy rules stored in the policy database based on data received from the another client computing device.

Example 89 includes the subject matter of any of Examples 61-88, and further including means for receiving a request for an activity log of the activity between the client computing device and the online service; and means for transmitting the activity log to the another client computing device.

The invention claimed is:

1. At least one server for being used in association with at least one server-provided online service, at least one first remote client computing device associated with a parent user, and at least one second remote client computing device associated with a child user, the at least one server comprising:
communication circuitry for permitting communication via an Internet network, when the at least one server is in operation, with the at least one first remote client computing device and the at least one second remote client computing device;
at least one processor; and
storage to store instructions that when executed by the at least one processor permit the at least one server to be configured to perform operations comprising:
storing, at least in part, at the at least one server, online child user identity profile data, the online child user identity profile data identifying, at least in part, the child user;
processing policy data provided, at least in part, via the at least one first remote client computing device, the policy data being configurable to indicate, at least in part, policy rules to be implemented, at least in part, via the at least one server to control, at least in part, usage of the at least one online server-provided service by the child user via the at least one second remote client computing device; and
processing request data from the at least one second remote client computing device, the request data indicating, at least in part, at least one request by the child user to use the at least one online server-provided service;
wherein:
the at least one server is configured to generate email notification data to be provided, at least in part, via the Internet network and the at least one first remote client computing device, the notification data being to notify, at least in part, the parent user of the at least one request and of the usage of the at least one online server-provided service by the child user;
determination of whether the at least one request is to be granted is to be based at least in part upon whether the at least one request is in accordance with the policy rules;
in response, at least in part, to authorization confirmation data to be provided, at least in part, via the Internet and the at least one first remote client computing device, the at least one server is configured to permit granting of the at least one request, the authorization confirmation data being to indicate, at least in part, that the granting of the at least one request is authorized by the parent user;
the policy rules are configurable to comprise:
at least one policy profile rule to be used by the at least one server in determining whether to permit, at least in part, online sharing of the online child user identity profile data in association with the at least one server-provided service; and
at least one access control rule that is to be used in determining whether to permit, at least in part, the usage of the at least one online server-provided service by the child user, the at least one access control rule being configurable to be based at least in part upon at least one restriction related to network searching; and
at least one purchase policy rule indicating at least one online purchase transaction parameter to be used by the at least one server in determining whether to notify the parent user and request purchase authorization from the parent user of a requested online purchase transaction by the child user that satisfies the at least one online purchase transaction parameter, the at least one server to prevent the requested online purchase transaction from being completed unless the purchase authorization is received from the parent user:
the at least one server is to monitor and restrict the online sharing of at least one portion of the online child user identity profile data based upon the at least one policy profile rule;
the at least one policy profile rule is to be set via the at least one first remote client computing device; and
the at least one server is to determine, based upon the at least one policy profile rule, which information contained in the online child user identity profile data is to be used by the at least one server to establish a public profile for the child user.

2. The at least one server of claim 1, wherein:
the at least one access control rule is capable of comprising white/black list information.

3. The at least one server of claim 1, wherein:
the at least one online server-provided service comprises a plurality of online services that are to be provided, at least in part, by a plurality of remote servers.

4. The at least one server of claim 1, wherein:
the at least one access control rule is also capable of being based at least in part upon time of day related restrictions.

5. The at least one server of claim 1, wherein:
the at least one server is to serve, at least in part, as a cloud-computing broker with respect to the at least one online server-provided service.

6. The at least one server of claim 1, wherein:
the at least one first remote client computing device and/or at least one second remote client computing device comprise at least one game-related client consumer electronic device.

7. The at least one server of claim 1, wherein:
the at least one first remote client computing device and the at least one second remote client computing device each comprise:
a desktop computer;
a workstation;
a laptop computer;
a notebook computer;
a tablet computer;
a smartphone;
a distributed computing system;
a multiprocessor system;
a consumer electronic device;
a smart television; and/or
a smart appliance.

8. Non-transitory machine-readable storage storing instructions to be executed by at one processor of at least one server, the at least one server to be used in association with at least one server-provided online service, at least one first remote client computing device associated with a parent user, and at least one second remote client computing device associated with a child user, the at least one server comprising communication circuitry, the communication circuitry being for permitting communication via an Internet network, when the at least one server is in operation, with the at least one first remote client computing device and the at least one second remote client computing device, the instructions when executed by the at least one processor resulting in the at least one server being configured to perform operations comprising:
storing, at least in part, at the at least one server, online child user identity profile data, the online child user identity profile data identifying, at least in part, the child user;
processing policy data provided, at least in part, via the at least one first remote client computing device, the policy data being configurable to indicate, at least in part, policy rules to be implemented, at least in part, via the at least one server to control, at least in part, usage of the at least one online server-provided service by the child user via the at least one second remote client computing device; and
processing request data from the at least one second remote client computing device, the request data indicating, at least in part, at least one request by the child user to use the at least one online server-provided service;
wherein:
the at least one server is configured to generate email notification data to be provided, at least in part, via the Internet network and the at least one first remote client computing device, the notification data being to notify, at least in part, the parent user of the at least one request and of the usage of the at least one online server-provided service by the child user;
determination of whether the at least one request is to be granted is to be based at least in part upon whether the at least one request is in accordance with the policy rules;
in response, at least in part, to authorization confirmation data to be provided, at least in part, via the Internet and the at least one first remote client computing device, the at least one server is configured to permit granting of the at least one request, the authorization confirmation data being to indicate, at least in part, that the granting of the at least one request is authorized by the parent user;
the policy rules are configurable to comprise:
at least one policy profile rule to be used by the at least one server in determining whether to permit, at least in part, online sharing of the online child user identity profile data in association with the at least one server-provided service;
at least one access control rule that is to be used in determining whether to permit, at least in part, the usage of the at least one online server-provided service by the child user, the at least one access control rule being configurable to be based at least in part upon at least one restriction related to network searching; and
at least one purchase policy rule indicating at least one online purchase transaction parameter to be used by the at least one server in determining whether to notify the parent user and request purchase authorization from the parent user of a requested online purchase transaction by the child user that satisfies the at least one online purchase transaction parameter, the at least one server to prevent the requested online purchase transaction from being completed unless the purchase authorization is received from the parent user:
the at least one server is to monitor and restrict the online sharing of at least one portion of the online child user identity profile data based upon the at least one policy profile rule;
the at least one policy profile rule is to be set via the at least one first remote client computing device; and
the at least one server is to determine, based upon the at least one policy profile rule, which information contained in the online child user identity profile data is to be used by the at least one server to establish a public profile for the child user.

9. The non-transitory machine-readable storage of claim 8, wherein:
the at least one access control rule is capable of comprising white/black list information.

10. The non-transitory machine-readable storage of claim 8, wherein:
the at least one online server-provided service comprises a plurality of online services that are to be provided, at least in part, by a plurality of remote servers.

11. The non-transitory machine-readable storage of claim 8, wherein:
the at least one access control rule is also capable of being based at least in part upon time of day related restrictions.

12. The non-transitory machine-readable storage of claim 8, wherein:
the at least one server is to serve, at least in part, as a cloud-computing broker with respect to the at least one online server-provided service.

13. The non-transitory machine-readable storage of claim 8, wherein:
the at least one first remote client computing device and/or at least one second remote client computing device comprise at least one game-related client consumer electronic device.

14. The non-transitory machine-readable storage of claim 8, wherein:
the at least one first remote client computing device and the at least one second remote client computing device each comprise:
a desktop computer;
a workstation;

a laptop computer;
a notebook computer;
a tablet computer;
a smartphone;
a distributed computing system;
a multiprocessor system;
a consumer electronic device;
a smart television; and/or
a smart appliance.

15. A method implemented, at least in part, using at least one server, the at least one server being for being used in association with at least one server-provided online service, at least one first remote client computing device associated with a parent user, and at least one second remote client computing device associated with a child user, the at least one server comprising communication circuitry, the communication circuitry being to permit communication via an Internet network, when the at least one server is in operation, with the at least one first remote client computing device and the at least one second remote client computing device, the method comprising:

storing, at least in part, at the at least one server, online child user identity profile data, the online child user identity profile data identifying, at least in part, the child user;

processing policy data provided, at least in part, via the at least one first remote client computing device, the policy data being for indicating, at least in part, policy rules to be implemented, at least in part, via the at least one server to control, at least in part, usage of the at least one online server-provided service by the child user via the at least one second remote client computing device; and processing request data from the at least one second remote client computing device, the request data indicating, at least in part, at least one request by the child user to use the at least one online server-provided service;

wherein:
the at least one server is to generate email notification data to be provided, at least in part, via the Internet network and the at least one first remote client computing device, the notification data being to notify, at least in part, the parent user of the at least one request and of the usage of the at least one online server-provided service by the child user;

determination of whether the at least one request is to be granted is to be based at least in part upon whether the at least one request is in accordance with the policy rules;

in response, at least in part, to authorization confirmation data to be provided, at least in part, via the Internet and the at least one first remote client computing device, the at least one server is to permit granting of the at least one request, the authorization confirmation data being to indicate, at least in part, that the granting of the at least one request is authorized by the parent user;

the policy rules comprise:
at least one policy profile rule to be used by the at least one server in determining whether to permit, at least in part, online sharing of the child user profile data with other users in association with the at least one server-provided service;

at least one access control rule is to be used in determining whether to permit, at least in part, the usage of the at least one online server-provided service by the child user, the at least one access control rule being based at least in part upon at least one restriction related to network searching; and at least one purchase policy rule indicating at least one online purchase transaction parameter to be used by the at least one server in determining whether to notify the parent user and request purchase authorization from the parent user of a requested online purchase transaction by the child user that satisfies the at least one online purchase transaction parameter, the at least one server to prevent the requested online purchase transaction from being completed unless the purchase authorization is received from the parent user:

the at least one server is to monitor and restrict the online sharing of at least one portion of the online child user identity profile data based upon the at least one policy profile rule;

the at least one policy profile rule is to be set via the at least one first remote client computing device; and the at least one server is to determine, based upon the at least one policy profile rule, which information contained in the online child user identity profile data is to be used by the at least one server to establish a public profile for the child user.

16. The method of claim 15, wherein:
the at least one access control rule is capable of comprising white/black list information.

17. The method of claim 15, wherein:
the at least one online server-provided service comprises a plurality of online services that are to be provided, at least in part, by a plurality of remote servers.

18. The method of claim 15, wherein:
the at least one access control rule is also capable of being based at least in part upon time of day related restrictions.

19. The method of claim 15, wherein:
the at least one server is to serve, at least in part, as a cloud-computing broker with respect to the at least one online server-provided service.

20. The method of claim 15, wherein:
the at least one first remote client computing device and/or at least one second remote client computing device comprise at least one game-related client consumer electronic device.

21. The method of claim 15, wherein:
the at least one first remote client computing device and the at least one second remote client computing device each comprise:
a desktop computer;
a workstation;
a laptop computer;
a notebook computer;
a tablet computer;
a smartphone;
a distributed computing system;
a multiprocessor system;
a consumer electronic device;
a smart television; and/or
a smart appliance.

22. At least one server to be used in association with at least one server-provided online service, at least one first remote client computing device associated with a parent user, and at least one second remote client computing device associated with a child user, the at least one server comprising:

communication means for permitting communication via an Internet network, when the at least one server is in operation, with the at least one first remote client computing device and the at least one second remote client computing device;

at least one processor means; and storage means for storing instructions that when executed by the at least one processor means permits the at least one server to be configured for performing operations comprising:

storing, at least in part, at the at least one server, online child user identity profile data, the online child user identity profile data identifying, at least in part, the child user;

processing policy data provided, at least in part, via the at least one first remote client computing device, the policy data indicating, at least in part, policy rules to be implemented, at least in part, via the at least one server to control, at least in part, usage of the at least one online server-provided service by the child user via the at least one second remote client computing device; and processing request data from the at least one second remote client computing device, the request data indicating, at least in part, at least one request by the child user to use the at least one online server-provided service;

wherein:

the at least one server is for generating email notification data to be provided, at least in part, via the Internet network and the at least one first remote client computing device, the notification data being to notify, at least in part, the parent user of the at least one request and of the usage of the at least one online server-provided service by the child user;

determination of whether the at least one request is to be granted is to be based at least in part upon whether the at least one request is in accordance with the policy rules;

in response, at least in part, to authorization confirmation data to be provided, at least in part, via the Internet and the at least one first remote client computing device, the at least one server is for permitting granting of the at least one request, the authorization confirmation data being to indicate, at least in part, that the granting of the at least one request is authorized by the parent user;

the policy rules comprise:

at least one policy profile rule to be used by the at least one server in determining whether to permit, at least in part, online sharing of the child user profile data with other users in association with the at least one server-provided service;

at least one access control rule that is to be used in determining whether to permit, at least in part, the usage of the at least one online server-provided service by the child user, the at least one access control rule being based at least in part upon at least one restriction related to network searching; and at least one purchase policy rule indicating at least one online purchase transaction parameter to be used by the at least one server in determining whether to notify the parent user and request purchase authorization from the parent user of a requested online purchase transaction by the child user that satisfies the at least one online purchase transaction parameter, the at least one server to prevent the requested online purchase transaction from being completed unless the purchase authorization is received from the parent user:

the at least one server is to monitor and restrict the online sharing of at least one portion of the online child user identity profile data based upon the at least one policy profile rule;

the at least one policy profile rule is to be set via the at least one first remote client computing device; and the at least one server is to determine, based upon the at least one policy profile rule, which information contained in the online child user identity profile data is to be used by the at least one server to establish a public profile for the child user.

23. The at least one server of claim 22, wherein:
the at least one access control rule is capable of comprising white/black list information.

24. The at least one server of claim 22, wherein:
the at least one online server-provided service comprises a plurality of online services that are to be provided, at least in part, by a plurality of remote servers.

25. The at least one server of claim 22, wherein:
the at least one access control rule is also capable of being based at least in part upon time of day related restrictions.

26. The at least one server of claim 22, wherein:
the at least one server is to serve, at least in part, as a cloud-computing broker with respect to the at least one online server-provided service.

27. The at least one server of claim 22, wherein:
the at least one first remote client computing device and/or at least one second remote client computing device comprise at least one game-related client consumer electronic device.

28. The at least one server of claim 22, wherein:
the at least one first remote client computing device and the at least one second remote client computing device each comprise:
a desktop computer;
a workstation;
a laptop computer;
a notebook computer;
a tablet computer;
a smartphone;
a distributed computing system;
a multiprocessor system;
a consumer electronic device;
a smart television; and/or
a smart appliance.

29. One or more servers to be used in association with one or more server-provided online services, one or more first remote client computing devices associated with a parent user, and one or more second remote client computing devices associated with a child user, the one or more servers comprising:

communication circuitry to permit communication via an Internet network, when the one or more servers are in operation, with the one or more first remote client computing devices and the one or more second remote client computing devices;

one or more processors; and storage to store instructions that when executed by the one or more processors permit the at least one server to be configured to perform operations comprising:

storing online child user identity profile data at the one or more servers, the online child user identity profile data identifying, at least in part, the child user;

processing policy data provided via the one or more first remote client computing devices, the policy data being to indicate policy rules to be implemented, at least in part, via the one or more servers to control, at least in part, usage of the one or more online server-provided services by the child user via the one or more second remote client computing devices; and processing request data from the one or more second remote client computing devices, the request data indicating, at least in part, one or more requests by the child user to use the one or more online server-provided services;

wherein:

the one or more servers are to generate email notification data to be provided, at least in part, via the Internet network and the one or more first remote client computing devices, the notification data being to notify, at least in part, the parent user of the one or more requests and of the usage of the one or more online server-provided services by the child user;

determination of whether the one or more requests are to be granted is to be based at least in part upon whether the one or more requests are in accordance with the policy rules;

in response, at least in part, to authorization confirmation data to be provided, at least in part, via the Internet and the one or more first remote client computing devices, the one or more servers are to permit granting of the one or more requests, the authorization confirmation data being to indicate that the granting of the one or more requests are authorized by the parent user;

the policy rules comprise:

one or more policy profile rules to be used by the one or more servers in determining whether to permit, at least in part, online sharing of the child user profile data with other users in association with the one or more server-provided services;

one or more access control rules that are to be used in determining whether to permit, at least in part, the usage of the one or more online server-provided services by the child user, the one or more access control rules being based at least in part upon one or more restrictions related to network searching; and at least one purchase policy rule indicating at least one online purchase transaction parameter to be used by the at least one server in determining whether to notify the parent user and request purchase authorization from the parent user of a requested online purchase transaction by the child user that satisfies the at least one online purchase transaction parameter, the at least one server to prevent the requested online purchase transaction from being completed unless the purchase authorization is received from the parent user:

the one or more servers are to monitor and restrict the online sharing of one or more portions of the online child user identity profile data based upon the one or more policy profile rules;

the one or more policy profile rules are to be set via the one or more first remote client computing devices; and the one or more servers are to determine, based upon the one or more policy profile rules, which information contained in the online child user identity profile data is to be used by the one or more servers to establish a public profile for the child user.

30. The one or more servers of claim 29, wherein:
the one or more access control rules are capable of comprising white/black list information.

31. The one or more servers of claim 29, wherein:
the one or more online server-provided services comprises a plurality of online services that are to be provided, at least in part, by a plurality of remote servers.

32. The one or more servers of claim 29, wherein:
the one or more access control rules are also capable of being based at least in part upon time of day related restrictions.

33. The one or more servers of claim 29, wherein:
the one or more servers are to serve, at least in part, as a cloud-computing broker with respect to the one or more online server-provided services.

34. The one or more servers of claim 29, wherein:
the one or more first remote client computing devices and/or one or more second remote client computing devices comprise one or more game-related client consumer electronic devices.

35. The one or more servers of claim 29, wherein:
the one or more first remote client computing devices and the one or more second remote client computing devices each comprise:
a desktop computer;
a workstation;
a laptop computer;
a notebook computer;
a tablet computer;
a smartphone;
a distributed computing system;
a multiprocessor system;
a consumer electronic device;
a smart television; and/or
a smart appliance.

* * * * *